July 6, 1943. G. A. WILDEBOOR 2,323,745
RAZOR
Filed Sept. 29, 1941
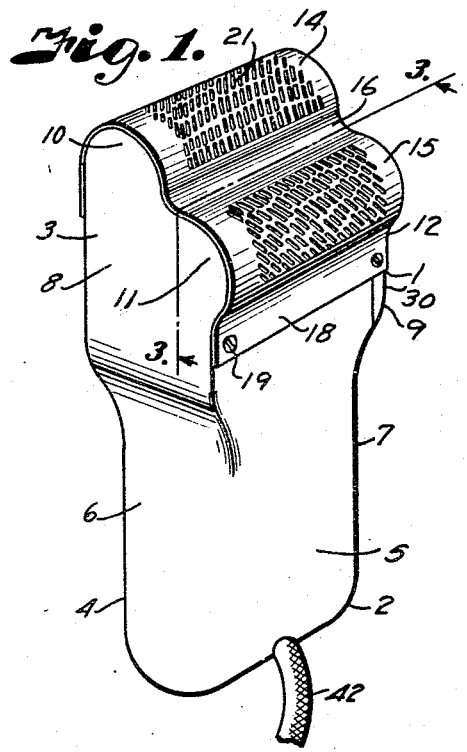
INVENTOR
George A. Wildeboor.
BY Arthur P. Brown, Jr.
ATTORNEY Patented July 6, 1943

2,323,745

UNITED STATES PATENT OFFICE 2,323,745

RAZOR

George A. Wildeboor, Harrisonville, Mo.

Application September 29, 1941, Serial No. 412,704

9 Claims. (Cl. 30—43)

This invention relates to razors, particularly to those of the type known as dry shavers, and has for its principal object to provide a razor of this character that is of simple, efficient construction, and capable of being inexpensively manufactured.

Another object of the invention is to provide a dry shaver with rotary cutters having relatively thin cutting elements movably mounted in the rotors for centrifugal contact with the shield member of the razor so that the shield acts as a hone to retain the blades in sharp condition.

Further objects of the invention are to provide a rotor arrangement that is self-clearing of hair; to provide for friction drive of the rotors; to provide blades that are readily removed and replaced with new blades when worn; and to provide a dry shaver that may be operated with a relatively small motor which may be electrical or spring wound type.

In accomplishing these and other objects of the invention, hereinafter pointed out, I have provided improved details of structure, the preferred form of which is illustrated in the accompanying drawing, wherein:

Fig. 1 is a perspective view of a dry shaver constructed in accordance with the present invention.

Fig. 2 is a cross-section through the cutting head, particularly illustrating mounting of the rotary cutters.

Fig. 3 is a section through the head of the razor on the line 3—3 of Fig. 1.

Fig. 4 is a cross-section on the line 4—4 of Fig. 3.

Fig. 5 is a perspective view of one of the rotary cutters.

Fig. 6 is a perspective view of one of the cutter blades.

Referring more in detail to the drawing:

1 designates a dry shaver constructed in accordance with the present invention and which includes a casing shaped to provide a handle 2 and a cutting head 3. The casing may be formed of any suitable material, such as metal or plastic, and has front and back walls 4—5 and side walls 6 and 7. The corners of the casing join the walls on rounding curves to provide the handle portion 2 and to form an enclosure for the driving member, such as a motor 8. The front wall terminates short of the back wall 4 and the sides 6 and 7 have extensions 8 and 9 provided with substantially semicircular wings 10 and 11 in step arrangement and adapted to cooperate with a shield 12 to close the open end of the casing.

The shield 12 is preferably formed of thin metal shaped to provide substantially semicylindrical concaves 14 and 15 interconnected by a reversely curved portion 16 and having ends 17 and 18 overlapping the upper edges of the wall portions 4 and 5 of the casing, as shown in Fig. 2.

The side edges of the shield closely conform to the wings 10 and 11 and are retained thereagainst by fastening devices 19 extending through the ends 17 and 18 and into threaded sockets 20 of the walls 4 and 5 as shown in Fig. 2. The concave portions of the shield are provided with a series of closely arranged slot-like apertures 21, arranged diagonally with respect to the axes of the concaves and with the apertures in one concave extending in opposite angular relationship to the apertures of the other concave, as shown in Fig. 1. The edges 22 of the apertures form cutting edges in cooperation with the cutting elements on the rotors 23 and 24, as now to be described.

Formed in the extension 11, coaxially with the semicircular wings thereof, are bosses 25 having axial bearings 26 cooperating with bearings 27 in the extension of the opposite side wall to journal the ends of rotor shafts 28 and 29. For convenience of manufacture and assembly of the rotors, the extension portion of the wall 7 is preferably in the form of a plate 30 which is removably secured in position by fastening devices 31. Fixed on the shafts, in spaced relation, are disks 32 and 33 having diametrically located slots 34 and 35 therein to support tongues 36 and 37 on the ends of cutter blades 38. The slots are arranged on chords of the disks and are of a length to conform to the width of the tongues so that when the tongues are engaged in the slots they have little or no movement in a circumferential direction. However, the slots are wider than the thickness of the tongues to allow freedom of movement in radial directions.

The cutter blades 38 are formed of relatively thin flexible material and have cutting edges 39 adapted to move in cutting contact with the inner surface of the concaves as the rotors are rotated. The disks 32 and 33 of the respective rotors are of a size that they frictionally interengage, as indicated at 40 in Fig. 2, to provide a driving connection therebetween so that when the rotor 23 is rotated in a clockwise direction, Fig. 2, the other rotor 24 rotates in a counter-clockwise direction whereby the rotors rotate toward each other and the cutting blades act as fans to discharge the cut hair between the rotors and into the body portion of the housing. The tongues 36 and 37, being loosely supported in a radial direction, move outwardly incidental to centrifugal force to maintain the cutting edges of the blades in sweeping contact with the inner surface of the concaves. Thus the concaves constitute a hone to retain the blades in sharp condition.

The bosses 25 space the rotors from the wall extension 8 to accommodate a friction drive wheel 41 therebetween which is carried by the motor unit 8 and has frictional driving contact with the disk 32 of the rotor 24. The motor 8 may be of any suitable type, for example an electric motor supplied with current through conductors indicated by the cord 42 which extends through a suitable opening in the casing and which is adapted to be connected with a suitable source of current supply. The armature shaft of the motor 8 is preferably connected with the drive shaft 43 of the friction wheel 41 through a reduction gearing (not shown), but which is contained in the housing 44 carried by the casing of the motor.

In assembling the razor, the blades, being of thin material, may be bowed sufficiently so that the tongues 36 and 37 readily enter the slots of the rotor disks. After the motor has been installed in the casing, the rotors with the cutter blades assembled therein are moved into position so that ends of the shafts engage the bearings 26, after which the plate 30 is applied so that the other ends of the shafts enter the bearings carried thereby. The plate is then secured by the fastening devices 31. The shield is then applied over the open end of the casing and secured by the fastening devices 19 to complete the assembly.

In operation, the motor is energized and the razor moved over the face with the exterior surface of the concaves in contact with the skin so that the whiskers pass through the slot-like perforations to be sheared off when the cutting elements of the blades move past the perforations. The severed ends of the whiskers are caught in the blast of air created incidental to rotation of the cutter blades and are discharged away from the concaves so that the razor is self-clearing of hair and the perforations remain open. The rotors operate at sufficient speed whereby the blades are kept in shearing contact with the concaves and movement thereover keeps the blades in sharpened condition.

While I have particularly described an electric motor, it is obvious that a spring wound motor may be substituted for the electric motor, as very little power is required in operating the rotors.

From the foregoing it is obvious that I have provided a dry shaver of simple, inexpensive construction, and which may be manufactured at small cost and sold at a low price to the user. It is also obvious that the cutting elements are self-sharpening and when worn may be readily replaced with new elements.

What I claim and desire to secure by Letters Patent is:

1. A device of the character described including, a casing, a shield carried by the casing and having spaced parallel concaves, rotors journalled in the casing and having cutting elements movable in contact with the inner surface of the concaves, said rotors having interengaging disks forming a frictional drive therebetween, and means for rotating one of said rotors to operate said rotors.

2. A device of the character described including, a casing, a shield carried by the casing and having spaced parallel concaves, rotors journalled in the casing and having cutting elements movable in contact with the inner surface of the concaves, said rotors having interengaging disks forming a frictional drive therebetween, and a friction wheel having frictional contact with one of said disks to operate said rotors.

3. A device of the character described including a casing, an extremely thin concave carried by the casing and having openings forming cutting edges, a rotor mounted for rotation in the casing, a substantially flat cutting element having a cutting edge cooperating with said cutting edges, means supporting the cutting element on the rotor in a plane substantially parallel with and offset from the axis of rotation of said rotor and for bodily movement of the cutting element radially of the rotor axis whereby the cutting edge of said element is kept in contact with the concave when the rotor is in operation, and means for actuating the rotor.

4. In a device of the character described, a rotor including a shaft, spaced disks on the shaft and having slots extending on chords of said disk in spaced relation from the axes thereof, and a cutting element having tongues engaged in said slots, said tongues having a width substantially corresponding to the length of said slots to support the cutting element from movement in the rotational direction of said rotor and having a thickness less than the width of said slots to provide for movement of the blade against the concave under centrifugal action responsive to rotation of said rotor.

5. A device of the character described including, a casing, a shell carried by the casing and having spaced parallel concaves interconnected by a reversely curved portion, rotors journalled in the casing and having cutting elements movable in contact with the inner surface of the concave, said cutters having interengaging portions forming a driving connection therebetween, and driving means for one of said rotors.

6. In a device of the character described, a rotor including spaced disks having registering seats forming substantially parallel blade engaging portions arranged on chords of said disks, means rigidly connecting the disks, and a substantially flat cutter blade having thickness less than the space between said blade engaging portions to accommodate bodily movement of the cutter blade radially outwardly from the rotational axis of said rotor.

7. A device of the character described including a casing, spaced parallel concaves carried by the casing, each having slot-like apertures arranged diagonally with respect to axes of the concaves with the apertures in one concave extending in opposite angular relationship to the apertures of the other concave, rotors in said casing having substantially flat cutting blades arranged to cooperate with edges of said apertures for severing hair passed through the apertures, interengaging wheels on said rotors, and means in said casing for rotating one of said rotors in one direction, said other rotor being rotated in the opposite direction incidental to said engagement of said wheels.

8. A device of the character described including a casing, spaced parallel concaves carried by the casing, each having slot-like apertures arranged diagonally with respect to axes of the concaves with the apertures in one concave extending in opposite angular relationship to the apertures of the other concave, rotors in said casing having substantially flat cutting blades arranged to cooperate with edges of said apertures for severing hair passed through the apertures, interengaging friction wheels on said rotors, and means in said casing for rotating one of said rotors in one direction, said other rotor being rotated in the opposite direction incidental to said frictional contact of said wheels.

9. A device of the character described including, a casing, an extremely thin concave carried by the casing and having openings forming cutting edges, a rotor mounted for rotation in the casing and having registering slot-like seats arranged in planes extending through chords of ends of the rotor, a substantially flat cutting element cooperating with said cutting edges and having loose support in said seats in a radial direction and having relatively no movement in said seats in the direction of rotation of said rotor, means for actuating the rotor, said loose mounting of the cutting element being arranged to admit a bodily movement of the cutting element into shearing contact with said cutting edges of the concave by centrifugal force produced through rotation of the rotor.

GEORGE A. WILDEBOOR.